United States Patent
Lee et al.

(10) Patent No.: US 11,415,126 B2
(45) Date of Patent: Aug. 16, 2022

(54) PISTON FOR COMPRESSOR

(71) Applicant: LG ELECTRONICS INC., Seoul (KR)

(72) Inventors: Youngmun Lee, Seoul (KR); Kyunyoung Lee, Seoul (KR); Kiwon Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 16/941,007

(22) Filed: Jul. 28, 2020

(65) Prior Publication Data

US 2021/0215153 A1     Jul. 15, 2021

(30) Foreign Application Priority Data

Jan. 9, 2020 (KR) .......................... 10-2020-0003291

(51) Int. Cl.
*F04B 53/14* (2006.01)
*F04B 53/16* (2006.01)

(52) U.S. Cl.
CPC ............ *F04B 53/148* (2013.01); *F04B 53/14* (2013.01); *F04B 53/162* (2013.01)

(58) Field of Classification Search
CPC .... F04B 39/0016; F04B 53/12; F04B 53/123; F04B 53/148
See application file for complete search history.

(56) References Cited

U.S. PATENT DOCUMENTS

| 1,873,878 A | | 8/1932 | Goldsborough | |
| 2,265,971 A | * | 12/1941 | Paul ........................ | B60C 23/10 417/231 |
| 4,119,244 A | * | 10/1978 | Funke .................. | B67D 1/0425 222/400.8 |

FOREIGN PATENT DOCUMENTS

| EP | 3242023 | 8/2017 |
| JP | 2003148239 | 5/2003 |
| KR | 1020190046539 | 5/2019 |
| KR | 101990140 | 6/2019 |

OTHER PUBLICATIONS

Extended European Search Report in European Appln. No. 20188979.7, dated Oct. 29, 2020, 7 pages.
Korean Office Action in Korean Appln. No. 10-2020-0003291, dated Oct. 23, 2020, 7 pages (with English translation).

* cited by examiner

*Primary Examiner* — F Daniel Lopez
(74) *Attorney, Agent, or Firm* — Fish & Richardson P.C.

(57) ABSTRACT

A piston for a compressor is disclosed. The piston for the compressor compressing and discharging a refrigerant sucked into a cylinder includes a sliding portion disposed in the cylinder and having a suction space to receive the sucked refrigerant, a head portion coupled to the sliding portion, a compression space being formed at a front of the head portion and the suction space being formed at a rear of the head portion, the head portion comprising a suction port communicating the suction space with the compression space, a press-fit cap coupled to the front of the head portion, the press-fit cap comprising a suction hole connected to the suction port, and a first elastic member disposed between the press-fit cap and the head portion. A gas layer is formed between the head portion, the press-fit cap, and the first elastic member.

20 Claims, 12 Drawing Sheets

PISTON FOR COMPRESSOR

CROSS REFERENCE TO RELATED APPLICATIONS

This application claims the benefit of Korea Patent Application No. 10-2020-0003291, filed on Jan. 9, 2020, which is incorporated herein by reference for all purposes as if fully set forth herein.

TECHNICAL FIELD

The present disclosure relates to a piston for a compressor. More specifically, the present disclosure relates to a piston for a linear compressor compressing a refrigerant by a linear reciprocating motion of the piston and a linear compressor including the piston.

BACKGROUND

In general, a compressor refers to a device that is configured to receive power from a power generator such as a motor or a turbine and compress a working fluid such as air or a refrigerant. More specifically, the compressors are widely used in the whole industry or home appliances, especially a steam compression refrigeration cycle (hereinafter, referred to as "refrigeration cycle").

The compressors may be classified into a reciprocating compressor, a rotary compressor, and a scroll compressor according to a method of compressing the refrigerant.

The reciprocating compressor uses a method in which a compression space is formed between a piston and a cylinder, and the piston linearly reciprocates to compress a fluid. The rotary compressor uses a method of compressing a fluid by a roller that eccentrically rotates inside a cylinder. The scroll compressor uses a method of compressing a fluid by engaging and rotating a pair of spiral scrolls.

Recently, among the reciprocating compressors, the use of linear compressors that use a linear reciprocating motion without using a crank shaft is gradually increasing. The linear compressor has advantages in that it has less mechanical loss resulting from switching a rotary motion to the linear reciprocating motion and thus can improve the efficiency, and has a relatively simple structure.

The linear compressor is configured such that a cylinder is positioned in a casing forming a sealed space to form a compression chamber, and a piston covering the compression chamber reciprocates inside the cylinder. The linear compressor repeats a process in which a fluid in the sealed space is sucked into the compression chamber while the piston is positioned at a bottom dead center (BDC), and the fluid of the compression chamber is compressed and discharged while the piston is positioned at a top dead center (TDC).

A compression unit and a drive unit are installed inside the linear compressor. The compression unit performs a process of compressing and discharging a refrigerant while performing a resonant motion by a resonant spring through a movement generated in the drive unit.

The piston of the linear compressor repeatedly performs a series of processes of sucking the refrigerant into the casing through a suction pipe while reciprocating at high speed inside the cylinder by the resonant spring, and then discharging the refrigerant from a compression space through a forward movement of the piston to move it to a condenser through a discharge pipe.

Referring to FIG. 12, Korean Patent No. 10-1990140 discloses that a suction port 1011 introducing a refrigerant into a compression space is formed in a front portion of a piston 1010, and a suction valve 1020 that opens and closes the suction port 1011 is provided in front of the suction port 1011.

The plurality of suction ports 1011 are formed to be spaced apart from a center C of a coupling hole 1012 in a radial direction by a predetermined length.

The suction valve 1020 is fastened to a piston 10 by a valve coupling member 1030 and includes a fixing part 1021 to which the valve coupling member 1030 is coupled, and a plurality of openings 1022 extended in an outward direction of the fixing part 1021. In this instance, the plurality of openings 1022 may be bent to the front to open the suction port 1011 and may be returned to the rear to close the suction port 1011.

However, a high temperature and high pressure gas compressed in the compression space acts as a heat source and generates heat transfer to a cylinder, the piston 1010, and the sucked refrigerant that have a relatively low temperature, leading to a heat loss and a reduction in compression efficiency.

Prior Art Document (Patent Document 1) Korean Patent No. 10-1990140 B (published on Jun. 18, 2019)

SUMMARY

An object of the present disclosure is to provide a piston for a compressor capable of preventing a heat loss and improving compression efficiency.

Particular implementations described herein provide a piston for a compressor. The compressor may include a cylinder configured to receive a refrigerant and be configured to compress and discharge the refrigerant in the cylinder. The piston may include a sliding portion, a head portion, a press-fit cap, and a first elastic member. The sliding portion may be disposed in the cylinder and define a suction space that receives the refrigerant. The head portion may be connected to the sliding portion and include a suction port that fluidly communicates with a compression space and the suction space. The compression space may be defined at a first side of the head portion. The suction space may be defined at a second side of the head portion opposite to the first side of the head portion. The press-fit cap may be connected to the first side of the head portion. The press-fit cap may include a suction hole that fluidly communicates with the suction port of the head portion. The first elastic member may be disposed between the press-fit cap and the head portion. The head portion, the press-fit cap, and the first elastic member may define a gas layer.

In some implementations, the piston described herein may optionally include one or more of the following features. The first elastic member may have a circular band shape. The first elastic member may be disposed radially closer to an axis of the piston than the suction port of the head portion. The piston may include a second elastic member disposed between the press-fit cap and the head portion around the first elastic member. The second elastic member may have a circular band shape. The second elastic member may be disposed radially farther from an axis of the piston than the suction port of the head portion. A space between the first elastic member and the second elastic member may fluidly communicate with the suction port and the suction hole. The head portion may include a coupling groove that is defined at the first side of the head portion and spaced apart from the suction port. The piston may include a coupling member that couples the press-fit cap to the first side of the head portion. The press-fit cap may include a coupling hole that is aligned with the coupling groove of the head portion. The coupling member may extend through the coupling hole and is coupled to the coupling groove. The first elastic member may be disposed between the coupling groove and the suction port. The head portion may include a gas groove between the coupling groove and the suction port. The head portion, the press-fit cap, the first elastic member, and the gas groove may define the gas layer. The gas groove may extend axially at the first side of the head portion. The gas groove may have a circular band shape.

Particular implementations described herein provide a piston for a compressor. The compressor may include a cylinder configured to receive a refrigerant and be configured to compress and discharge the refrigerant in the cylinder. The piston may include a sliding portion, a head portion, and a heat insulating member. The sliding portion may be disposed in the cylinder and define a suction space that receives the refrigerant. The head portion may be connected to the sliding portion and include a suction port that fluidly communicates with a compression space and the suction space. The compression space may be defined at a first side of the head portion. The suction space may be defined at a second side of the head portion opposite to the first side of the head portion. The heat insulating member may be connected to the first side of the head portion. The heat insulating member may include a suction port reception hole that at least partially receives the suction port of the head portion.

In some implementations, the piston described herein may optionally include one or more of the following features. The suction port may protrude axially from the first side of the head portion. The head portion may include a coupling port that protrudes axially from the first side of the head portion and is spaced apart from the suction port. The piston may include a coupling member that couples the heat insulating member to the first side of the head portion. The heat insulating member may include a coupling port reception hole that at least partially receives the coupling port. The coupling member may extend through the coupling port reception hole and is coupled to the coupling port. The piston may include a first elastic member disposed between the heat insulating member and the head portion. The head portion, the heat insulating member, and the first elastic member may define a gas layer. The first elastic member may have a circular band shape. The piston may include a second elastic member disposed between the heat insulating member and the head portion around the first elastic member.

In one aspect, there is provided a piston used in a compressor compressing and discharging a refrigerant sucked into a cylinder, the piston comprising a sliding portion disposed in the cylinder and having a suction space to receive the sucked refrigerant; a head portion coupled to the sliding portion, a compression space being formed at a front of the head portion and the suction space being formed at a rear of the head portion, the head portion comprising a suction port communicating the suction space with the compression space; a press-fit cap coupled to the front of the head portion, the press-fit cap comprising a suction hole connected to the suction port; and a first elastic member disposed between the press-fit cap and the head portion, wherein a gas layer is formed between the head portion, the press-fit cap, and the first elastic member.

The first elastic member may be formed in a circular band shape.

The first elastic member may be disposed inside the suction port.

The piston for the compressor may further comprise a second elastic member disposed between the press-fit cap and the head portion and outside the first elastic member.

The second elastic member may be formed in a circular band shape, and the second elastic member may be disposed outside the suction port.

A space between the first elastic member and the second elastic member may communicate with the suction port and the suction hole.

The head portion may comprise a coupling groove formed in a central region of a front surface of the head portion, and the suction port may be spaced apart from the coupling groove.

The piston for the compressor may further comprise a coupling member configured to couple the press-fit cap to the front of the head portion. The press-fit cap may comprise a coupling hole that is formed in a central region of the press-fit cap and corresponds to the coupling groove, and the coupling member may pass through the coupling hole and may be coupled to the coupling groove.

The first elastic member may be disposed between the coupling groove and the suction port.

The head portion may comprise a gas groove between the coupling groove and the suction port.

The gas layer may be formed between the head portion, the press-fit cap, the first elastic member, and the gas groove.

The gas groove may extend rearward from the front surface of the head portion.

The gas groove may be formed in a circular band shape.

In another aspect, there is provided a piston used in a compressor compressing and discharging a refrigerant sucked into a cylinder, the piston comprising a sliding portion disposed in the cylinder and having a suction space to receive the sucked refrigerant; a head portion coupled to the sliding portion, a compression space being formed at a front of the head portion and the suction space being formed at a rear of the head portion, the head portion comprising a suction port communicating the suction space with the compression space; and a heat insulating member coupled to the front of the head portion, the heat insulating member comprising a suction port hole in which the suction port is disposed.

The suction port may protrude forward from a front surface of the head portion.

The head portion may comprise a coupling port that protrudes forward in a central region of the front surface of the head portion, and the suction port may be spaced apart from the coupling port.

The piston for the compressor may further comprise a coupling member configured to couple the heat insulating member to the front of the head portion. The heat insulating member may comprise a coupling port hole which is formed in a central region of the heat insulating member and in which the coupling port is disposed. The coupling member may pass through the coupling port hole and may be coupled to the coupling port.

The piston for the compressor may further comprise a first elastic member disposed between the heat insulating member and the head portion. A gas layer may be formed between the head portion, the heat insulating member, and the first elastic member.

The first elastic member may be formed in a circular band shape.

The piston for the compressor may further comprise a second elastic member disposed between the heat insulating member and the head portion and outside the first elastic member.

The present disclosure can provide a piston for a compressor capable of preventing a heat loss and improving compression efficiency.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

In embodiments of the disclosure, when an arbitrary component is described as "being connected to" or "being coupled to" other component, it should be understood that another component(s) may exist between them, although the arbitrary component may be directly connected or coupled to the other component.

It will be noted that a detailed description of known arts will be omitted if it is determined that the detailed description of the known arts can obscure embodiments of the disclosure. The accompanying drawings are used to help easily understand various technical features and it should be understood that embodiments presented herein are not limited by the accompanying drawings. As such, the present disclosure should be understand to extend to any alterations, equivalents and substitutes in addition to those which are particularly set out in the accompanying drawings.

In addition, a term of "disclosure" may be replaced by document, specification, description, etc.

Figure 1:
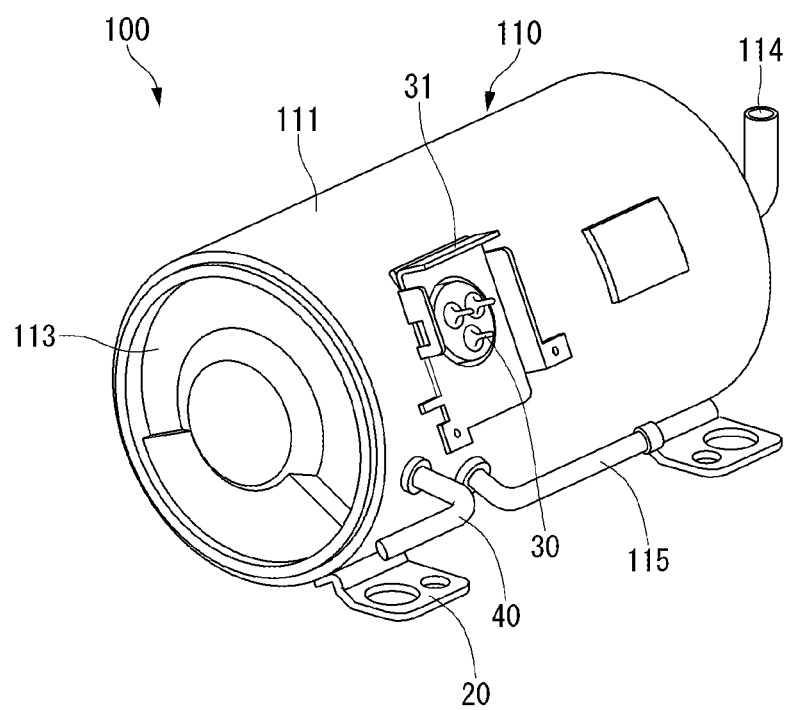
FIG. 1 is a perspective view of a compressor according to an embodiment of the disclosure.

FIG. 1 is a perspective view of a compressor according to an embodiment of the disclosure.

Referring to FIG. 1, a linear compressor 100 according to an embodiment of the disclosure may include a shell 111 and shell covers 112 and 113 coupled to the shell 111. In a broad sense, the shell covers 112 and 113 can be understood as one configuration of the shell 111.

Legs 20 may be coupled to a lower side of the shell 111. The legs 20 may be coupled to a base of a product on which the linear compressor 100 is mounted. For example, the product may include a refrigerator, and the base may include a machine room base of the refrigerator. As another example, the product may include an outdoor unit of an air conditioner, and the base may include a base of the outdoor unit.

The shell 111 may have a substantially cylindrical shape and may be disposed to lie in a horizontal direction or an axial direction. FIG. 1 illustrates that the shell 111 is extended in the horizontal direction and has a slightly low height in a radial direction, by way of example. That is, since the linear compressor 100 can have a low height, there is an advantage in that a height of the machine room can decrease when the linear compressor 100 is installed in, for example, the machine room base of the refrigerator.

A longitudinal central axis of the shell 111 coincides with a central axis of a main body of the compressor 100 to be described later, and the central axis of the main body of the compressor 100 coincides with a central axis of a cylinder 140 and a piston 150 constituting the main body of the compressor 100.

A terminal 30 may be installed on an external surface of the shell 111. The terminal 30 may transmit external electric power to a drive unit 130 of the linear compressor 100. More specifically, the terminal 30 may be connected to a lead line of a coil 132b.

A bracket 31 may be installed on the outside of the terminal 30. The bracket 31 may include a plurality of brackets surrounding the terminal 30. The bracket 31 may perform a function of protecting the terminal 30 from an external impact, etc.

Both sides of the shell 111 may be opened. The shell covers 112 and 113 may be coupled to both sides of the opened shell 111. More specifically, the shell covers 112 and 113 may include a first shell cover 112 coupled to one opened side of the shell 111 and a second shell cover 113 coupled to the other opened side of the shell 111. An inner space of the shell 111 may be sealed by the shell covers 112 and 113.

FIG. 1 illustrates that the first shell cover 112 is positioned on the right side of the linear compressor 100, and the second shell cover 113 is positioned on the left side of the linear compressor 100, by way of example. In other words, the first and second shell covers 112 and 113 may be disposed to face each other. It can be understood that the first shell cover 112 is positioned on a suction side of a refrigerant, and the second shell cover 113 is positioned on a discharge side of the refrigerant.

The linear compressor 100 may include a plurality of pipes 114, 115, and 40 that are included in the shell 111 or the shell covers 112 and 113 and can suck, discharge, or inject the refrigerant.

The plurality of pipes 114, 115, and 40 may include a suction pipe 114 that allows the refrigerant to be sucked into the linear compressor 100, a discharge pipe 115 that allows the compressed refrigerant to be discharged from the linear compressor 100, and a supplementary pipe 40 for supplementing the refrigerant in the linear compressor 100.

For example, the suction pipe 114 may be coupled to the first shell cover 112. The refrigerant may be sucked into the linear compressor 100 along the axial direction through the suction pipe 114.

The discharge pipe 115 may be coupled to an outer circumferential surface of the shell 111. The refrigerant sucked through the suction pipe 114 may be compressed while flowing in the axial direction. The compressed refrigerant may be discharged through the discharge pipe 115. The discharge pipe 115 may be disposed closer to the second shell cover 113 than to the first shell cover 112.

The supplementary pipe 40 may be coupled to the outer circumferential surface of the shell 111. A worker may inject the refrigerant into the linear compressor 100 through the supplementary pipe 40.

The supplementary pipe 40 may be coupled to the shell 111 at a different height from the discharge pipe 115 in order to prevent interference with the discharge pipe 115. Here, the height may be understood as a distance measured from the leg 20 in a vertical direction. Because the discharge pipe 115 and the supplementary pipe 40 are coupled to the outer circumferential surface of the shell 111 at different heights, the work convenience can be attained.

On an inner circumferential surface of the shell 111 corresponding to a location at which the supplementary pipe 40 is coupled, at least a portion of the second shell cover 113 may be positioned adjacently. In other words, at least a portion of the second shell cover 113 may act as a resistance of the refrigerant injected through the supplementary pipe 40.

Thus, with respect to a flow path of the refrigerant, a size of the flow path of the refrigerant introduced through the supplementary pipe 40 is configured to decrease by the second shell cover 113 while the refrigerant enters into the inner space of the shell 111, and again increase while the refrigerant passes through the second shell cover 113. In this process, a pressure of the refrigerant may be reduced to vaporize the refrigerant, and an oil contained in the refrigerant may be separated. Thus, while the refrigerant, from which the oil is separated, is introduced into the piston 150, a compression performance of the refrigerant can be improved. The oil may be understood as a working oil present in a cooling system.

Figure 2:
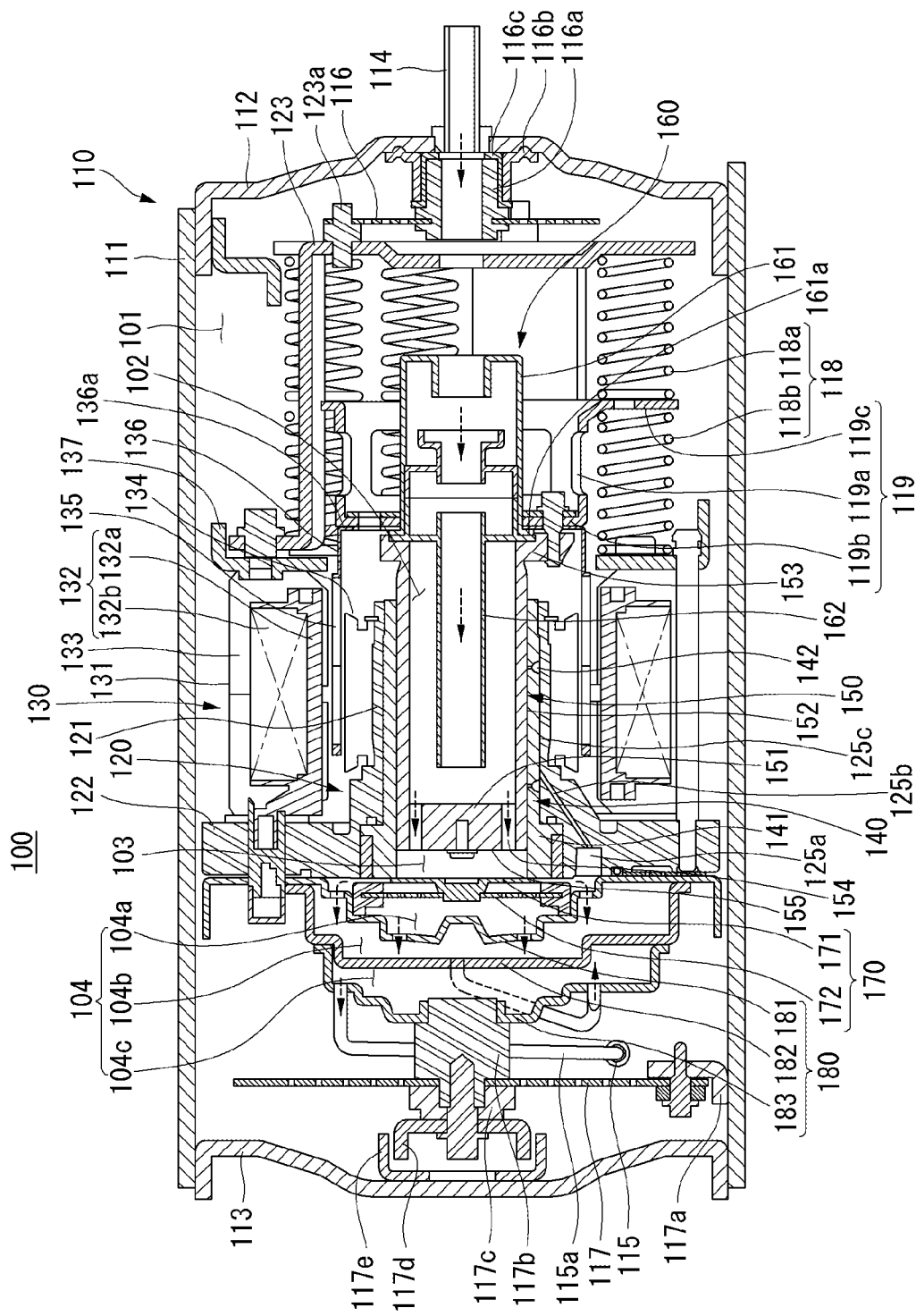
FIG. 2 is a cross-sectional view illustrating a structure of a compressor according to an embodiment of the disclosure.

FIG. 2 is a cross-sectional view illustrating a structure of the compressor 100.

Hereinafter, a compressor according to the present disclosure will be described taking, as an example, a linear compressor that sucks and compresses a fluid while a piston linearly reciprocates, and discharges the compressed fluid.

The linear compressor may be a component of a refrigeration cycle, and the fluid compressed in the linear compressor may be a refrigerant circulating the refrigeration cycle. The refrigeration cycle may include a condenser, an expander, an evaporator, etc., in addition to the compressor. The linear compressor may be used as a component of the cooling system of the refrigerator, but is not limited thereto. The linear compressor can be widely used in the whole industry.

Referring to FIG. 2, the compressor 100 may include a casing 110 and a main body received in the casing 110. The main body of the compressor 100 may include a frame 120, the cylinder 140 fixed to the frame 120, the piston 150 that linearly reciprocates inside the cylinder 140, the drive unit 130 that is fixed to the frame 120 and gives a driving force to the piston 150, and the like. Here, the cylinder 140 and the piston 150 may be referred to as compression units 140 and 150.

The compressor 100 may include a bearing means for reducing a friction between the cylinder 140 and the piston 150. The bearing means may be an oil bearing or a gas bearing. Alternatively, a mechanical bearing may be used as the bearing means.

The main body of the compressor 100 may be elastically supported by support springs 116 and 117 installed at both ends inside the casing 110. The support springs 116 and 117 may include a first support spring 116 for supporting the rear of the main body and a second support spring 117 for supporting a front of the main body. The support springs 116 and 117 may include a leaf spring. The support springs 116 and 117 can absorb vibrations and impacts generated by a reciprocating motion of the piston 150 while supporting the internal parts of the main body of the compressor 100.

The casing 110 may form a sealed space. The sealed space may include a receiving space 101 in which the sucked refrigerant is received, a suction space 102 which is filled with the refrigerant before the compression, a compression space 103 in which the refrigerant is compressed, and a discharge space 104 which is filled with the compressed refrigerant.

The refrigerant sucked from the suction pipe 114 connected to the rear side of the casing 110 may be filled in the receiving space 101, and the refrigerant in the suction space 102 communicating with the receiving space 101 may be compressed in the compression space 103, discharged into the discharge space 104, and discharged to the outside through the discharge pipe 115 connected to the front side of the casing 110.

The casing 110 may include the shell 111 formed in a substantially cylindrical shape that is open at both ends and is long in a transverse direction, the first shell cover 112 coupled to the rear side of the shell 111, and the second shell cover 113 coupled to the front side of the shell 111. Here, it can be understood that the front side is the left side of the figure and is a direction in which the compressed refrigerant is discharged, and the rear side is the right side of the figure and is a direction in which the refrigerant is introduced. Further, the first shell cover 112 and the second shell cover 113 may be formed as one body with the shell 11.

The casing 110 may be formed of a thermally conductive material. Hence, heat generated in the inner space of the casing 110 can be quickly dissipated to the outside.

The first shell cover 112 may be coupled to the shell 111 in order to seal the rear of the shell 111, and the suction pipe 114 may be inserted and coupled to the center of the first shell cover 112.

The rear of the main body of the compressor 100 may be elastically supported by the first support spring 116 in the radial direction of the first shell cover 112.

The first support spring 116 may include a circular leaf spring. An edge of the first support spring 116 may be elastically supported by a support bracket 123a in a forward direction with respect to a back cover 123. An opened center portion of the first support spring 116 may be supported by a suction guide 116a in a rearward direction with respect to the first shell cover 112.

The suction guide 116a may have a through passage formed therein. The suction guide 116a may be formed in a cylindrical shape. A front outer circumferential surface of the suction guide 116a may be coupled to a central opening of the first support spring 116, and a rear end of the suction guide 116a may be supported by the first shell cover 112. In this instance, a separate suction side support member 116b may be interposed between the suction guide 116a and an inner surface of the first shell cover 112.

A rear side of the suction guide 116a may communicate with the suction pipe 114, and the refrigerant sucked through the suction pipe 114 may pass through the suction guide 116a and may be smoothly introduced into a muffler unit 160 to be described later.

A damping member 116c may be disposed between the suction guide 116a and the suction side support member 116b. The damping member 116c may be formed of a rubber material or the like. Hence, a vibration that may occur in the process of sucking the refrigerant through the suction pipe 114 can be prevented from being transmitted to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and then may be discharged into the refrigeration cycle through the loop pipe 115a and the discharge pipe 115.

A front side of the main body of the compressor 100 may be elastically supported by the second support spring 117 in the radial direction of the shell 111 or the second shell cover 113.

The second support spring 117 may include a circular leaf spring. An opened center portion of the second support spring 117 may be supported by a first support guide 117b in a rearward direction with respect to the discharge cover assembly 180. An edge of the second support spring 117 may be supported by a support bracket 117a in a forward direction with respect to the inner surface of the shell 111 or the inner circumferential surface of the shell 111 adjacent to the second shell cover 113.

Unlike FIG. 2, the edge of the second support spring 117 may be supported in the forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117 may have a plurality of diameters. A front side of the first support guide 117 may be inserted into a central opening of the second support spring 117, and a rear side of the first support guide 117 may be inserted into a central opening of the discharge cover assembly 180. A support cover 117c may be coupled to the front side of the first support guide 117b with the second support spring 117 interposed therebetween. A cup-shaped second support guide 117d that is recessed forward may be coupled to the front side of the support cover 117c. A cup-shaped third support guide 117e that corresponds to the second support guide 117d and is recessed rearward may be coupled to the inside of the second shell cover 113. The second support guide 117d may be inserted into the third support guide 117e and may be supported in the axial direction and/or the radial direction. In this instance, a gap may be formed between the second support guide 117d and the third support guide 117e.

The frame 120 may include a body portion 121 supporting the outer circumferential surface of the cylinder 140, and a first flange portion 122 that is connected to one side of the body portion 121 and supports the drive unit 130. The frame 120 may be elastically supported with respect to the casing 110 by the first and second support springs 116 and 117 together with the drive unit 130 and the cylinder 140.

The body portion 121 may wrap the outer circumferential surface of the cylinder 140. The body portion 121 may be formed in a cylindrical shape. The first flange portion 122 may extend from a front end of the body portion 121 in the radial direction.

The cylinder 140 may be coupled to an inner circumferential surface of the body portion 121. An inner stator 134 may be coupled to an outer circumferential surface of the body portion 121. For example, the cylinder 140 may be pressed and fitted to the inner circumferential surface of the body portion 121, and the inner stator 134 may be fixed using a separate fixing ring (not shown).

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

On one side of the front surface of the first flange portion 122, a bearing inlet groove 125a forming a part of the gas bearing may be formed, a bearing communication hole 125b penetrating from the bearing inlet groove 125a to the inner circumferential surface of the body portion 121 may be formed, and a gas groove 125c communicating with the bearing communication hole 125b may be formed on the inner circumferential surface of the body portion 121.

The bearing inlet groove 125a may be recessed to a predetermined depth in the axial direction. The bearing communication hole 125b is a hole having a smaller cross-sectional area than the bearing inlet groove 125a and may be inclined toward the inner circumferential surface of the body portion 121. The gas groove 125c may be formed in an annular shape having a predetermined depth and an axial length on the inner circumferential surface of the body portion 121. Alternatively, the gas groove 125c may be formed on the outer circumferential surface of the cylinder 140 in contact with the inner circumferential surface of the body portion 121, or formed on both the inner circumferential surface of the body portion 121 and the outer circumferential surface of the cylinder 140.

In addition, a gas inlet 142 corresponding to the gas groove 125c may be formed on the outer circumferential surface of the cylinder 140. The gas inlet 142 forms a kind of nozzle in the gas bearing.

The frame 120 and the cylinder 140 may be formed of aluminum or an aluminum alloy material.

The cylinder 140 may be formed in a cylindrical shape that is open at both ends. The piston 150 may be inserted through a rear end of the cylinder 140. A front end of the cylinder 140 may be closed via a discharge valve assembly 170. The compression space 103 may be formed between the cylinder 140, a front end of the piston 150, and the discharge valve assembly 170. Here, the front end of the piston 150 may be referred to as a head portion 151. The compression space 103 increases in volume when the piston 150 moves backward, and decreases in volume as the piston 150 moves forward. That is, the refrigerant introduced into the compression space 103 may be compressed while the piston 150 moves forward, and may be discharged through the discharge valve assembly 170.

The cylinder 140 may include a second flange portion 141 disposed at the front end. The second flange portion 141 may bend to the outside of the cylinder 140. The second flange portion 141 may extend in an outer circumferential direction of the cylinder 140. The second flange portion 141 of the cylinder 140 may be coupled to the frame 120. For example, the front end of the frame 120 may include a flange groove corresponding to the second flange portion 141 of the cylinder 140, and the second flange portion 141 of the cylinder 140 may be inserted into the flange groove and coupled through a coupling member.

A gas bearing means may be provided to supply a discharge gas to a gap between the outer circumferential surface of the piston 150 and the outer circumferential surface of the cylinder 140 and lubricate between the cylinder 140 and the piston 150 with gas. The discharge gas between the cylinder 140 and the piston 150 may provide a floating force to the piston 150 to reduce a friction generated between the piston 150 and the cylinder 140.

For example, the cylinder 140 may include the gas inlet 142. The gas inlet 142 may communicate with the gas groove 125c formed on the inner circumferential surface of the body portion 121. The gas inlet 142 may pass through the cylinder 140 in the radial direction. The gas inlet 142 may guide the compressed refrigerant introduced in the gas groove 125c between the inner circumferential surface of the cylinder 140 and the outer circumferential surface of the piston 150. Alternatively, the gas groove 125c may be formed on the outer circumferential surface of the cylinder 140 in consideration of the convenience of processing.

An entrance of the gas inlet 142 may be formed relatively widely, and an exit of the gas inlet 142 may be formed as a fine through hole to serve as a nozzle. The entrance of the gas inlet 142 may further include a filter (not shown) blocking the inflow of foreign matter. The filter may be a metal mesh filter, or may be formed by winding a member such as fine thread.

The plurality of gas inlets 142 may be independently formed. Alternatively, the entrance of the gas inlet 142 may be formed as an annular groove, and a plurality of exits may be formed along the annular groove at regular intervals. The gas inlet 142 may be formed only at the front side based on the axial middle of the cylinder 140. On the contrary, the gas inlet 142 may be formed at the rear side based on the axial middle of the cylinder 140 in consideration of the sagging of the piston 150.

The piston 150 is inserted into the opened rear end of the cylinder 140 and is provided to seal the rear of the compression space 103.

The piston 150 may include a head portion 151 and a guide portion 152. The head portion 151 may be formed in a disc shape. The head portion 151 may be partially open. The head portion 151 may partition the compression space 103. The guide portion 152 may extend rearward from an outer circumferential surface of the head portion 151. The guide portion 152 may be formed in a cylindrical shape. The inside of the guide portion 152 may be empty, and a front of the guide portion 152 may be partially sealed by the head portion 151. A rear of the guide portion 152 may be opened and connected to the muffler unit 160. The head portion 151 may be provided as a separate member coupled to the guide portion 152. Alternatively, the head portion 151 and the guide portion 152 may be formed as one body.

The piston 150 may include a suction port 154. The suction port 154 may pass through the head portion 151. The suction port 154 may communicate with the suction space 102 and the compression space 103 inside the piston 150. For example, the refrigerant flowing from the receiving space 101 to the suction space 102 inside the piston 150 may pass through the suction port 154 and may be sucked into the compression space 103 between the piston 150 and the cylinder 140.

The suction port 154 may extend in the axial direction of the piston 150. The suction port 154 may be inclined in the axial direction of the piston 150. For example, the suction port 154 may extend to be inclined in a direction away from the central axis as it goes to the rear of the piston 150.

A cross section of the suction port 154 may be formed in a circular shape. The suction port 154 may have a constant inner diameter. In contrast, the suction port 154 may be formed as a long hole in which an opening extends in the radial direction of the head portion 151, or may be formed such that the inner diameter becomes larger as it goes to the rear.

The plurality of suction ports 154 may be formed in one or more of the radial direction and the circumferential direction of the head portion 151.

The head portion 151 of the piston 150 adjacent to the compression space 103 may be equipped with a suction valve 155 for selectively opening and closing the suction port 154. The suction valve 155 may operate by elastic deformation to open or close the suction port 154. That is, the suction valve 155 may be elastically deformed to open the suction port 154 by the pressure of the refrigerant flowing into the compression space 103 through the suction port 154.

The piston 150 may be connected to a mover 135. The mover 135 may reciprocate forward and backward according to the movement of the piston 150. The inner stator 134 and the cylinder 140 may be disposed between the mover 135 and the piston 150. The mover 135 and the piston 150 may be connected to each other by a magnet frame 136 that is formed by detouring the cylinder 140 and the inner stator 134 to the rear.

The muffler unit 160 may be coupled to the rear of the piston 150 to reduce a noise generated in the process of sucking the refrigerant into the piston 150. The refrigerant sucked through the suction pipe 114 may flow into the suction space 102 inside the piston 150 via the muffler unit 160.

The muffler unit 160 may include a suction muffler 161 communicating with the receiving space 101 of the casing 110, and an inner guide 162 that is connected to a front of the suction muffler 161 and guides the refrigerant to the suction port 154.

The suction muffler 161 may be positioned in the rear of the piston 150. A rear opening of the suction muffler 161 may be disposed adjacent to the suction pipe 114, and a front end of the suction muffler 161 may be coupled to the rear of the piston 150. The suction muffler 161 may have a flow path formed in the axial direction to guide the refrigerant in the receiving space 101 to the suction space 102 inside the piston 150.

The inside of the suction muffler 161 may include a plurality of noise spaces partitioned by a baffle. The suction muffler 161 may be formed by combining two or more members. For example, a second suction muffler may be press-coupled to the inside of a first suction muffler to form a plurality of noise spaces. In addition, the suction muffler 161 may be formed of a plastic material in consideration of weight or insulation property.

One side of the inner guide 162 may communicate with the noise space of the suction muffler 161, and other side may be deeply inserted into the piston 150. The inner guide 162 may be formed in a pipe shape. Both ends of the inner guide 162 may have the same inner diameter. The inner guide 162 may be formed in a cylindrical shape. Alternatively, an inner diameter of a front end that is a discharge side of the inner guide 162 may be greater than an inner diameter of a rear end opposite the front end.

The suction muffler 161 and the inner guide 162 may be provided in various shapes and may adjust the pressure of the refrigerant passing through the muffler unit 160. The suction muffler 161 and the inner guide 162 may be formed as one body.

The discharge valve assembly 170 may include a discharge valve 171 and a valve spring 172 that is provided on a front side of the discharge valve 171 to elastically support the discharge valve 171. The discharge valve assembly 170 may selectively discharge the compressed refrigerant in the compression space 103. Here, the compression space 103 means a space between the suction valve 155 and the discharge valve 171.

The discharge valve 171 may be disposed to be supportable on the front surface of the cylinder 140. The discharge valve 171 may selectively open and close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, the compression space 103 may maintain a sealed state while the discharge valve 171 is supported on the front surface of the cylinder 140, and the compressed refrigerant of the compression space 103 may be discharged into an opened space in a state where the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability.

When the pressure of the compression space 103 is equal to or greater than a discharge pressure, the valve spring 172 may open the discharge valve 171 while deforming forward, and the refrigerant may be discharged from the compression space 103 and discharged into a first discharge space 104a of the discharge cover assembly 180. When the discharge of the refrigerant is completed, the valve spring 172 provides a restoring force to the discharge valve 171 and thus can allow the discharge valve 171 to be closed.

A process of introducing the refrigerant into the compression space 103 through the suction valve 155 and discharging the refrigerant of the compression space 103 to the discharge space 104 through the discharge valve 171 is described as follows.

In the process in which the piston 150 linearly reciprocates inside the cylinder 140, if the pressure of the compression space 103 is equal to or less than a predetermined suction pressure, the suction valve 155 is opened and thus the refrigerant is sucked into a compression space 103. On the other hand, if the pressure of the compression space 103 exceeds the predetermined suction pressure, the refrigerant of the compression space 103 is compressed in a state in which the suction valve 155 is closed.

If the pressure of the compression space 103 is equal to or greater than the predetermined suction pressure, the valve spring 172 deforms forward and opens the discharge valve 171 connected to the valve spring 172, and the refrigerant is discharged from the compression space 103 to the discharge space 104 of the discharge cover assembly 180. When the discharge of the refrigerant is completed, the valve spring 172 provides a restoring force to the discharge valve 171 and allows the discharge valve 171 to be closed, thereby sealing a front of the compression space 103.

The discharge cover assembly 180 is installed at the front of the compression space 103, forms a discharge space 104 for receiving the refrigerant discharged from the compression space 103, and is coupled to a front of the frame 120 to thereby reduce a noise generated in the process of discharging the refrigerant from the compression space 103. The discharge cover assembly 180 may be coupled to a front of the first flange portion 122 of the frame 120 while receiving the discharge valve assembly 170. For example, the discharge cover assembly 180 may be coupled to the first flange portion 122 through a mechanical coupling member.

An O-ring 166 may be provided between the discharge cover assembly 180 and the frame 120 to prevent the refrigerant in a gasket 165 for thermal insulation and the discharge space 104 from leaking.

The discharge cover assembly 180 may be formed of a thermally conductive material. Therefore, when a high temperature refrigerant is introduced into the discharge cover assembly 180, heat of the refrigerant may be transferred to the casing 110 through the discharge cover assembly 180 and dissipated to the outside of the compressor.

The discharge cover assembly 180 may include one discharge cover, or may be arranged so that a plurality of discharge covers sequentially communicates with each other. When the discharge cover assembly 180 is provided with the plurality of discharge covers, the discharge space 104 may include a plurality of spaces partitioned by the respective discharge covers. The plurality of spaces may be disposed in a front-rear direction and may communicate with each other.

For example, when there are three discharge covers, the discharge space 104 may include a first discharge space 104a between the frame 120 and a first discharge cover 181 coupled to the front side of the frame 120, a second discharge space 104b between the first discharge cover 181 and a second discharge cover 182 that communicates with the first discharge space 104a and is coupled to a front side of the first discharge cover 181, and a third discharge space 104c between the second discharge cover 182 and a third discharge cover 183 that communicates with the second discharge space 104b and is coupled to a front side of the second discharge cover 182.

The first discharge space 104a may selectively communicate with the compression space 103 by the discharge valve 171, the second discharge space 104b may communicate with the first discharge space 104a, and the third discharge space 104c may communicate with the second discharge space 104b. Hence, as the refrigerant discharged from the compression space 103 sequentially passes through the first discharge space 104a, the second discharge space 104b, and the third discharge space 104c, a discharge noise can be reduced, and the refrigerant can be discharged to the outside of the casing 110 through the loop pipe 115a and the discharge pipe 115 communicating with the third discharge cover 183.

The drive unit 130 may include the outer stator 131 that is disposed between the shell 111 and the frame 120 and surrounds the body portion 121 of the frame 120, the inner stator 134 that is disposed between the outer stator 131 and the cylinder 140 and surrounds the cylinder 140, and the mover 135 disposed between the outer stator 131 and the inner stator 134.

The outer stator 131 may be coupled to the rear of the first flange portion 122 of the frame 120, and the inner stator 134 may be coupled to the outer circumferential surface of the body portion 121 of the frame 120. The inner stator 134 may be spaced apart from the inside of the outer stator 131, and the mover 135 may be disposed in a space between the outer stator 131 and the inner stator 134.

The outer stator 131 may be equipped with a winding coil, and the mover 135 may include a permanent magnet. The permanent magnet may consist of a single magnet with one pole or configured by combining a plurality of magnets with three poles.

The outer stator 131 may include a coil winding 132 surrounding the axial direction in the circumferential direction and a stator core 133 stacked while surrounding the coil winding 132. The coil winding 132 may include a hollow cylindrical bobbin 132a and a coil 132b wound in a circumferential direction of the bobbin 132a. A cross section of the coil 132b may be formed in a circular or polygonal shape, for example, may have a hexagonal shape. In the stator core 133, a plurality of lamination sheets may be laminated radially, or a plurality of lamination blocks may be laminated along the circumferential direction.

The front side of the outer stator 131 may be supported by the first flange portion 122 of the frame 120, and the rear side thereof may be supported by a stator cover 137. For example, the stator cover 137 may be provided in a hollow disc shape, a front surface of the stator cover 137 may be supported by the outer stator 131, and a rear surface thereof may be supported by a resonant spring 118.

The inner stator 134 may be configured by stacking a plurality of laminations on the outer circumferential surface of the body portion 121 of the frame 120 in the circumferential direction.

One side of the mover 135 may be coupled to and supported by the magnet frame 136. The magnet frame 136 has a substantially cylindrical shape and may be disposed to be inserted into a space between the outer stator 131 and the inner stator 134. The magnet frame 136 may be coupled to the rear side of the piston 150 to move together with the piston 150.

As an example, a rear end of the magnet frame 136 is bent and extended inward in the radial direction to form a first coupling portion 136a, and the first coupling portion 136a may be coupled to a third flange portion 153 formed in the rear of the piston 150. The first coupling portion 136a of the magnet frame 136 and the third flange portion 153 of the piston 150 may be coupled through a mechanical coupling member.

A fourth flange portion 161a in front of the suction muffler 161 may be interposed between the third flange portion 153 of the piston 150 and the first coupling portion 136a of the magnet frame 136. Thus, the piston 150, the muffler unit 160, and the mover 135 can linearly reciprocate together in a combined state.

When a current is applied to the drive unit 130, a magnetic flux may be formed in the winding coil, and an electromagnetic force may occur by an interaction between the magnetic flux formed in the winding coil of the outer stator 131 and a magnetic flux formed by the permanent magnet of the mover 135 to move the mover 135. At the same time as the axial reciprocating movement of the mover 135, the piston 150 connected to the magnet frame 136 may also reciprocate integrally with the mover 135 in the axial direction.

The drive unit 130 and the compression units 140 and 150 may be supported by the support springs 116 and 117 and the resonant spring 118 in the axial direction.

The resonant spring 118 amplifies the vibration implemented by the reciprocating motion of the mover 135 and the piston 150 and thus can achieve an effective compression of the refrigerant. More specifically, the resonant spring 118 may be adjusted to a frequency corresponding to a natural frequency of the piston 150 to allow the piston 150 to perform a resonant motion. Further, the resonant spring 118 generates a stable movement of the piston 150 and thus can reduce the generation of vibration and noise.

The resonant spring 118 may be a coil spring extending in the axial direction. Both ends of the resonant spring 118 may be connected to a vibrating body and a fixed body, respectively. For example, one end of the resonant spring 118 may be connected to the magnet frame 136, and the other end may be connected to the back cover 123. Therefore, the resonant spring 118 may be elastically deformed between the vibrating body vibrating at one end and the fixed body fixed to the other end.

A natural frequency of the resonant spring 118 may be designed to match a resonant frequency of the mover 135 and the piston 150 during the operation of the compressor 100, thereby amplifying the reciprocating motion of the piston 150. However, because the back cover 123 provided as the fixing body is elastically supported by the first support spring 116 in the casing 110, the back cover 123 may not be strictly fixed.

The resonant spring 118 may include a first resonant spring 118a supported on the rear side and a second resonant spring 118b supported on the front side based on a spring supporter 119.

The spring supporter 119 may include a body portion 119a surrounding the suction muffler 161, a second coupling portion 119b that is bent from a front of the body portion 119a in the inward radial direction, and a support portion 119c that is bent from the rear of the body portion 119a in the outward radial direction.

A front surface of the second coupling portion 119b of the spring supporter 119 may be supported by the first coupling portion 136a of the magnet frame 136. An inner diameter of the second coupling portion 119b of the spring supporter 119 may cover an outer diameter of the suction muffler 161. For example, the second coupling portion 119b of the spring supporter 119, the first coupling portion 136a of the magnet frame 136, and the third flange portion 153 of the piston 150 may be sequentially disposed and then integrally coupled via a mechanical member. In this instance, the description that the fourth flange portion 161a of the suction muffler 161 can be interposed between the third flange portion 153 of the piston 150 and the first coupling portion 136a of the magnet frame 136, and they can be fixed together is the same as that described above.

The first resonant spring 118a may be disposed between a front surface of the back cover 123 and a rear surface of the spring supporter 119. The second resonant spring 118b may be disposed between a rear surface of the stator cover 137 and a front surface of the spring supporter 119.

A plurality of first and second resonant springs 118a and 118b may be disposed in the circumferential direction of the central axis. The first resonant springs 118a and the second resonant springs 118b may be disposed parallel to each other in the axial direction, or may be alternately disposed. The first and second resonant springs 118a and 118b may be disposed at regular intervals in the radial direction of the central axis. For example, three first resonant springs 118a and three second resonant springs 118b may be provided and may be disposed at intervals of 120 degrees in the radial direction of the central axis.

The compressor 100 may include a plurality of sealing members that can increase a coupling force between the frame 120 and the components around the frame 120.

For example, the plurality of sealing members may include a first sealing member that is interposed at a portion where the frame 120 and the discharge cover assembly 180 are coupled and is inserted into an installation groove provided at the front end of the frame 120, and a second sealing member that is provided at a portion at which the frame 120 and the cylinder 140 are coupled and is inserted into an installation groove provided at an outer surface of the cylinder 140. The second sealing member can prevent the refrigerant of the gas groove 125c between the inner circumferential surface of the frame 120 and the outer circumferential surface of the cylinder 140 from leaking to the outside, and can increase a coupling force between the frame 120 and the cylinder 140. The plurality of sealing members may further include a third sealing member that is provided at a portion at which the frame 120 and the inner stator 134 are coupled and is inserted into an installation groove provided at the outer surface of the frame 120. Here, the first to third sealing members may have a ring shape.

An operation of the linear compressor 100 described above is as follows.

First, when a current is applied to the drive unit 130, a magnetic flux may be formed in the outer stator 131 by the current flowing in the coil 132b. The magnetic flux formed in the outer stator 131 may generate an electromagnetic force, and the mover 135 including the permanent magnet may linearly reciprocate by the generated electromagnetic force. The electromagnetic force is generated in a direction (forward direction) in which the piston 150 is directed toward a top dead center (TDC) during a compression stroke, and is alternately generated in a direction (rearward direction) in which the piston 150 is directed toward a bottom dead center (BDC) during a suction stroke. That is, the drive unit 130 may generate a thrust which is a force for pushing the mover 135 and the piston 150 in a moving direction.

The piston 150 linearly reciprocating inside the cylinder 140 may repeatedly increase or reduce volume of the compression space 103.

When the piston 150 moves in a direction (rearward direction) of increasing the volume of the compression space 103, a pressure of the compression space 103 may decrease. Hence, the suction valve 155 mounted in front of the piston 150 is opened, and the refrigerant remaining in the suction space 102 may be sucked into the compression space 103 along the suction port 154. The suction stroke may be performed until the piston 150 is positioned in the bottom dead center by maximally increasing the volume of the compression space 103.

The piston 150 reaching the bottom dead center may perform the compression stroke which switching its motion direction and moving in a direction (forward direction) of reducing the volume of the compression space 103. As the pressure of the compression space 103 increases during the compression stroke, the sucked refrigerant may be compressed. When the pressure of the compression space 103 reaches a setting pressure, the discharge valve 171 is pushed out by the pressure of the compression space 103 and is opened from the cylinder 140, and the refrigerant can be discharged into the discharge space 104 through a separation space. The compression stroke can continue while the piston 150 moves to the top dead center at which the volume of the compression space 103 is minimized.

As the suction stroke and the compression stroke of the piston 150 are repeated, the refrigerant introduced into the receiving space 101 inside the compressor 100 through the suction pipe 114 may be introduced into the suction space 102 inside the piston 150 by sequentially passing the suction guide 116a, the suction muffler 161, and the inner guide 162, and the refrigerant of the suction space 102 may be introduced into the compression space 103 inside the cylinder 140 during the suction stroke of the piston 150. After the refrigerant of the compression space 103 is compressed and discharged into the discharge space 104 during the compression stroke of the piston 150, the refrigerant may be discharged to the outside of the compressor 100 via the loop pipe 115a and the discharge pipe 115.

Figure 3:
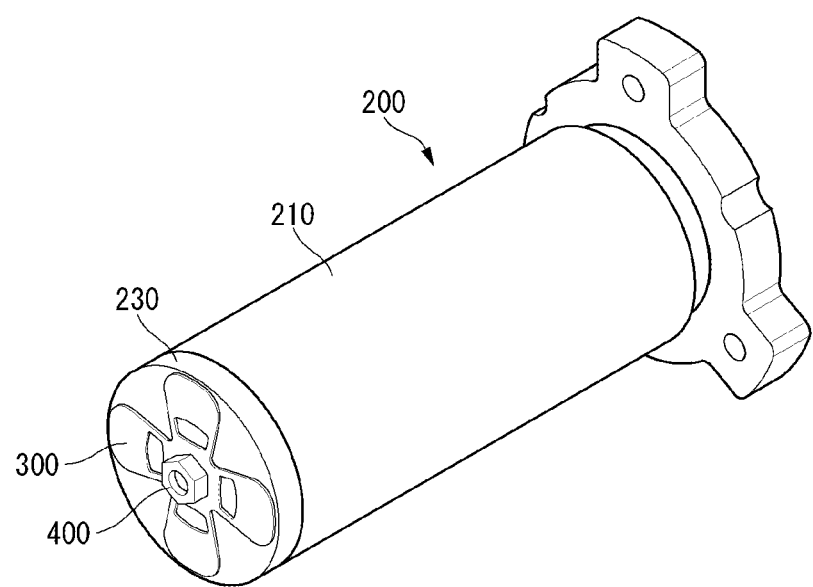
FIG. 3 is a perspective view of a piston for a compressor according to an embodiment of the disclosure.
Figure 4:
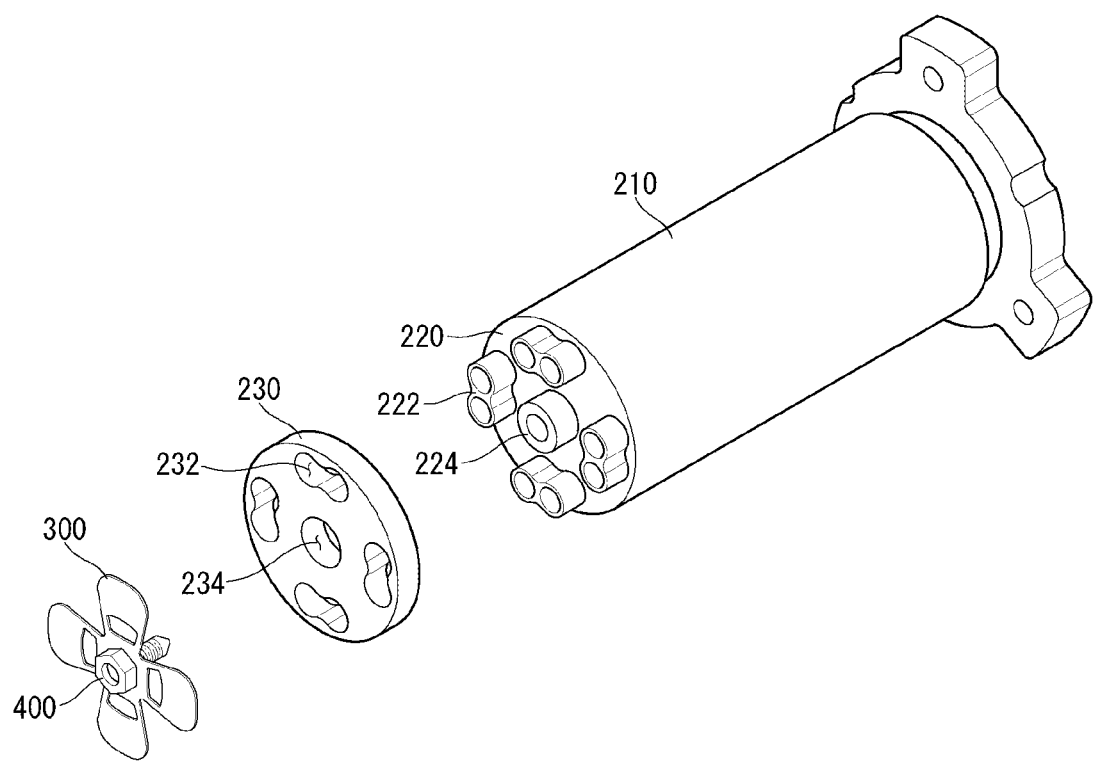
FIG. 4 is an exploded perspective view of a piston for a compressor according to an embodiment of the disclosure.
Figure 5:
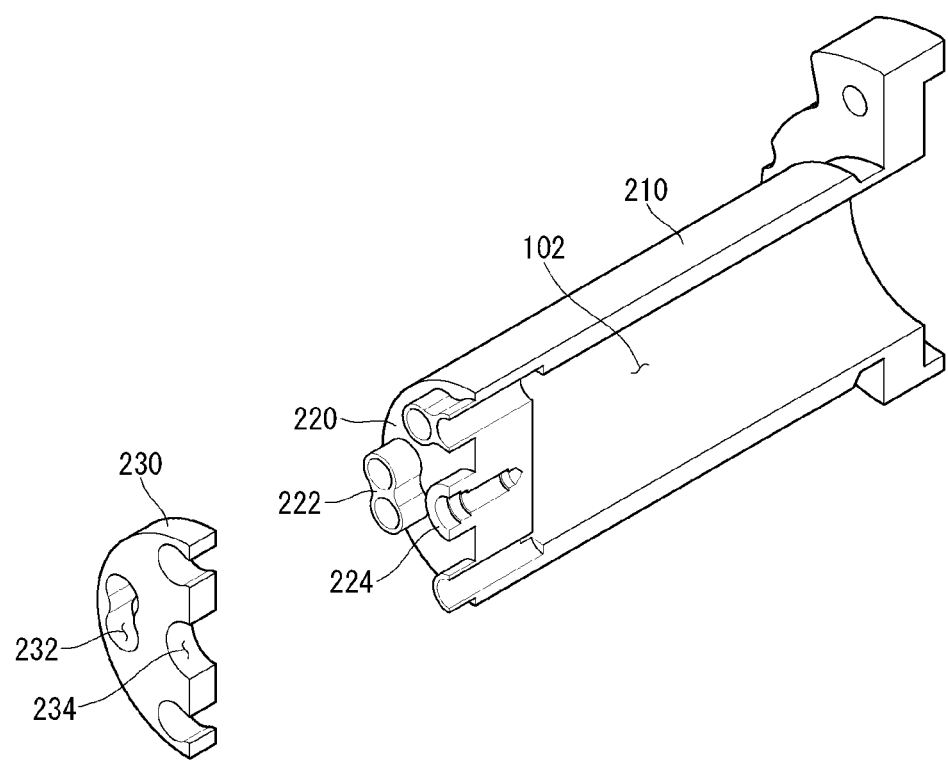
FIG. 5 is a cross-sectional view of a partial configuration of FIG. 3.
Figure 6:
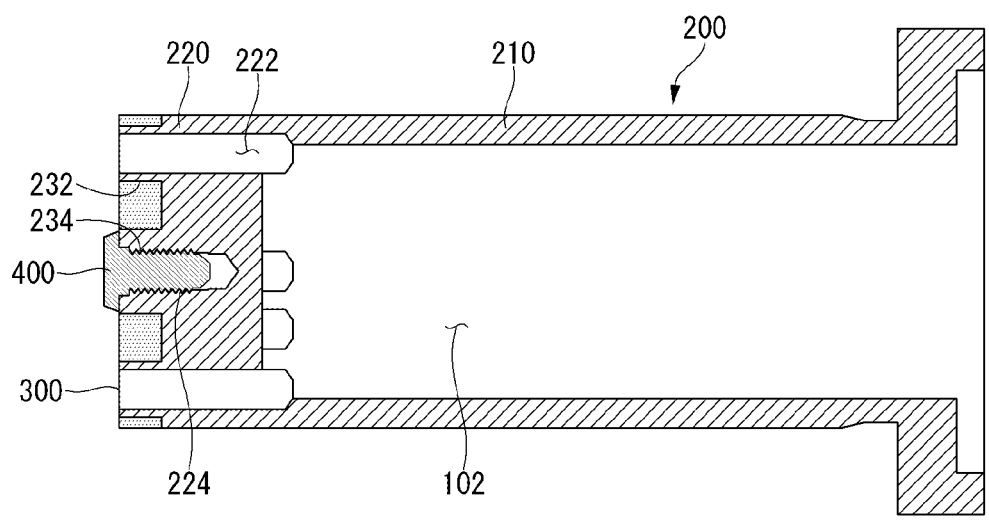
FIG. 6 is a cross-sectional view of a piston for a compressor according to an embodiment of the disclosure.

FIG. 3 is a perspective view of a piston for a compressor according to an embodiment of the disclosure. FIG. 4 is an exploded perspective view of a piston for a compressor according to an embodiment of the disclosure. FIG. 5 is a cross-sectional view of a partial configuration of FIG. 3. FIG. 6 is a cross-sectional view of a piston for a compressor according to an embodiment of the disclosure.

Referring to FIGS. 3 to 6, a piston 200 according to an embodiment of the disclosure may include a sliding portion 210, a head portion 220, a heat insulating member 230, a suction valve 300, and a coupling member 400, but can be implemented except some of these components and does not exclude additional components.

The piston 200 may be used in the compressor 100 that compresses and discharges a refrigerant sucked into the cylinder 140. The piston 200 may be disposed in the cylinder 140. The piston 200 may include a suction space 102 receiving the refrigerant sucked therein. The compression space 103 may be formed at a front of the piston 200. The piston 200 may be formed in a cylindrical shape.

The piston 200 may include the sliding portion 210. The sliding portion 210 may be disposed in the cylinder 140. The sliding portion 210 may include the suction space 102 receiving the refrigerant sucked therein. At a front of the sliding portion 210, the head portion 220, the heat insulating member 230, the suction valve 300, and the coupling member 400 may be disposed. The sliding portion 210 may be formed in a cylindrical shape. The sliding portion 210 may extend in the axial direction to correspond to an inner wall shape of the cylinder 140. The sliding portion 210 may be hollow and have a predetermined thickness in a circumferential direction. The suction space 102 may be formed in the sliding portion 210.

An outer wall of the sliding portion 210 may face an inner wall of the cylinder 140. The sliding portion 210 may linearly reciprocate forward and backward inside the cylinder 140. The outer wall of the sliding portion 210 may generate a friction with the inner wall of the cylinder 140. To prevent this, a surface processing for reducing the friction may be performed on an outer circumferential surface of the sliding portion 210. The surface processing can improve a wear resistance, lubricity or a thermal resistance. In this instance, the surface processing may be performed on an inner circumferential surface of the cylinder 140 as well as the outer circumferential surface of the sliding portion 210.

The surface processing of the sliding portion 210 may be performed on both its outer circumferential surface and inner circumferential surface. In this case, the surface processing may be simultaneously performed on the outer circumferential surface and the inner circumferential surface of the sliding portion 210. When the surface processing is performed only on the outer circumferential surface of the sliding portion 210, there is an advantage in that a coating material can be saved. When the surface processing is performed on both the outer circumferential surface and the inner circumferential surface of the sliding portion 210, there is an advantage in that the surface processing is simplified.

The surface processing of the sliding portion 210 may use one of diamond like carbon (DLC), polytetrafluoroethylene (PTFE) (Teflon), a nickel (Ni)-phosphorus (P) alloy material, and an anodizing layer.

DLC is an amorphous carbon-based new material and contains a material in the form of a thin film formed by electrically accelerating carbon ions or activated hydrocarbon molecules in the plasma and hitting them on the surface.

Since the properties of DLC are similar to that of diamond and have high hardness, a wear resistance, excellent electrical insulation, and a low friction coefficient, DLC has excellent lubricity characteristics.

As another example, PTFE is sprayed onto a coated object in a state in which a fluorine resin is coated, and is heated and fired at a predetermined temperature to form an inert coating layer. Since PTFE has a low friction coefficient, it can improve lubricity of the surface and a wear resistance.

As another example, the Ni—P alloy material may be included in the outer circumferential surface of the piston 200 or the inner circumferential surface of the cylinder 140 by an electroless nickel plating method, and may be formed by surface-depositing a nickel component and a phosphorus component with a uniform thickness. The Ni—P alloy material may have a chemical composition ratio of 90 to 92% of nickel (Ni) and 9 to 10% of phosphorus (P). The Ni—P alloy material improves a corrosion resistance and a wear resistance of the surface and has excellent lubricity characteristics.

As another example, an anodizing technology is a kind of aluminum painted coating and is a processing technology in which an aluminum surface is oxidized by oxygen generated in an anode when aluminum is used as the anode and electric current flows therein, and an aluminum oxide layer is formed. The anodizing technology has characteristics of excellent corrosion resistance and excellent insulation resistance.

The piston 200 may include the head portion 220. The head portion 220 may be coupled to the front of the sliding portion 210. A cross section of the head portion 220 may have a circular shape. The head portion 220 may have a disc shape. The head portion 220 may selectively (or partially) close a front opening of the sliding portion 210. Here, the partially closing may mean to close a portion except a suction port 222. The head portion 220 may be provided as a separate member that is inserted and coupled to the front opening of the sliding portion 210. On the contrary, the head portion 220 may be formed integrally with the sliding portion 210.

The head portion 220 may be formed in a cylindrical shape extending in the axial direction. An outer diameter of the head portion 220 may be provided to correspond to an inner diameter of the sliding portion 210. The head portion 220 may be press-fitted to the sliding portion 210 or may be coupled to the sliding portion 210 through an adhesive. Alternatively, the outer diameter of the head portion 220 may be provided to correspond to an outer diameter of the sliding portion 210. In this case, the head portion 220 may be coupled to the front of the sliding portion 210 using an adhesive, etc.

A compression space 103 may be formed at a front of the head portion 220. The suction space 102 may be formed at the rear of the head portion 220.

The head portion 220 may include the suction port 222. The suction port 222 may communicate the compression space 103 with the suction space 102. The suction port 222 may be formed in a cylindrical shape. The suction port 222 may be formed on the front surface of the head portion 220.

The suction port 222 may be formed to protrude forward from the front surface of the head portion 220. The suction port 222 may be disposed in the heat insulating member 230. The suction port 222 may be disposed in a suction port hole 232 of the heat insulating member 230. The suction port 222 may be spaced apart from a coupling port 224. The suction port 222 may be formed in a region between a central region and an edge region of the front surface of the head portion 220. The suction port 222 may include a hole therein. The suction port 222 may include a plurality of suction ports. The plurality of suction ports may be spaced apart from each other. The plurality of suction ports may be disposed at positions symmetrical to each other about the coupling port 224.

The head portion 220 may include the coupling port 224. The coupling port 224 may be formed in a cylindrical shape. The coupling port 224 may be formed on the front surface of the head portion 220. The coupling port 224 may be formed to protrude forward from the front surface of the head portion 220. The coupling port 224 may be disposed in the heat insulating member 230. The coupling port 224 may be disposed in a coupling port hole 234 of the heat insulating member 230. The coupling port 224 may be spaced apart from the suction port 222. The coupling port 224 may be formed in the central region of the front surface of the head portion 220. The coupling member 400 may be fastened to the coupling port 224.

The piston 200 may include the heat insulating member 230. The heat insulating member 230 may be disposed in front of the sliding portion 210. The heat insulating member 230 may be disposed in front of the head portion 220. The heat insulating member 230 may be coupled to the head portion 220. The heat insulating member 230 may be coupled to the front of the head portion 220. The heat insulating member 230 may be coupled to the front surface of the head portion 220. The heat insulating member 230 may be formed in a disc shape or a cylindrical shape. The heat insulating member 230 may be formed of a material with low thermal conductivity. Hence, the heat insulating member 230 can prevent heat transfer to the cylinder 140, pistons 150 and 200, and sucked refrigerant of a relatively low temperature generated as a high temperature and high pressure gas compressed in the compression space 103 acts as a heat source.

The heat insulating member 230 may include the suction port hole 232. The suction port hole 232 may pass through the heat insulating member 230. The suction port hole 232 may pass through the heat insulating member 230 along the axial direction. A cross section of the suction port hole 232 may have a circular shape. The suction port 222 may be disposed in the suction port hole 232. The suction port 222 may be disposed in the suction port hole 232. The suction port hole 232 may be penetrated by the suction port 222. An inner diameter of the suction port hole 232 may correspond to an outer diameter of the suction port 222. The suction port 222 may be fitted to the suction port hole 232. Hence, space efficiency can be improved. An axial length of the suction port hole 232 may correspond to an axial length of the suction port 222. The suction port hole 232 may be formed in a region between a central region and an edge region of the heat insulating member 230. The suction port hole 232 may be spaced apart from a coupling port hole 234. The suction port hole 232 may include a plurality of suction port holes. The plurality of suction port holes 232 may be disposed at positions symmetrical to each other based on the coupling port hole 234.

The heat insulating member 230 may include the coupling port hole 234. The coupling port hole 234 may pass through the heat insulating member 230. The coupling port hole 234 may pass through the heat insulating member 230 along the axial direction. A cross section of the coupling port hole 234 may have a circular shape. The coupling port 224 may be disposed in the coupling port hole 234. The coupling port hole 234 may be penetrated by the coupling port 224. An inner diameter of the coupling port hole 234 may correspond to an outer diameter of the coupling port 224. The coupling port 224 may be fitted to the coupling port hole 234. Hence, space efficiency can be improved. An axial length of the coupling port hole 234 may correspond to an axial length of the coupling port 224. The coupling port hole 234 may be formed in the central region of the heat insulating member 230. The coupling port hole 234 may be spaced apart from the suction port hole 232.

The piston 200 may include the suction valve 300. The suction valve 300 may be coupled to the front of the piston 200. The suction valve 300 may be coupled to the front of the head portion 220. The suction valve 300 may be coupled to a front of the heat insulating member 230. The suction valve 300 may be coupled to a front surface of the heat insulating member 230.

The suction valve 300 may be formed of a thin plate member or sheet with a circular shape. The suction valve 300 may be provided to reversibly modify its shape. Hence, during a suction stroke in which the piston 200 reverses, the suction valve 300 may be modified to open the suction port 222 and allow the refrigerant of the suction space 102 to be discharged into the compression space 103. During a compression stroke in which the piston 200 moves forward, the suction valve 300 may close the suction port 222 and prevent the refrigerant from returning again to the suction space 102.

The suction valve 300 may open selectively the suction port 222. More specifically, the suction valve 300 may have a movement to repeatedly close or open the suction port 222 while going through the compression stroke and the suction stroke.

The suction valve 300 may include a fixing portion, at the center, fixed to the front surface of the heat insulating member 230, a wing portion, in a peripheral region, that can be modified to close or open the suction port 222, and a connection portion that connects the fixing portion to the wing portion.

An embodiment of the present disclosure is described by taking an example where the suction valve 300 is the partial configuration of the piston 200, but the suction valve 300 may also be understood as a member separate from the piston 200.

The piston 200 may include the coupling member 400. The coupling member 400 may couple the heat insulating member 230 and the suction valve 300 to the front of the head portion 220. The coupling member 400 may pass through the fixing portion of the suction valve 300. The coupling member 400 may pass through the coupling port hole 234 of the heat insulating member 230. The coupling member 400 may be coupled to the coupling port 224. Hence, the coupling member 400 can couple the heat insulating member 230 of the suction valve 300 to the head portion 220.

An embodiment of the present disclosure is described by taking an example where the coupling member 400 is the partial configuration of the piston 200, but the coupling member 400 may also be understood as a member separate from the piston 200. Further, an embodiment of the present disclosure is described by taking an example where the coupling member 400 is screwed to the coupling port 224, but can be variously changed.

Figure 7:
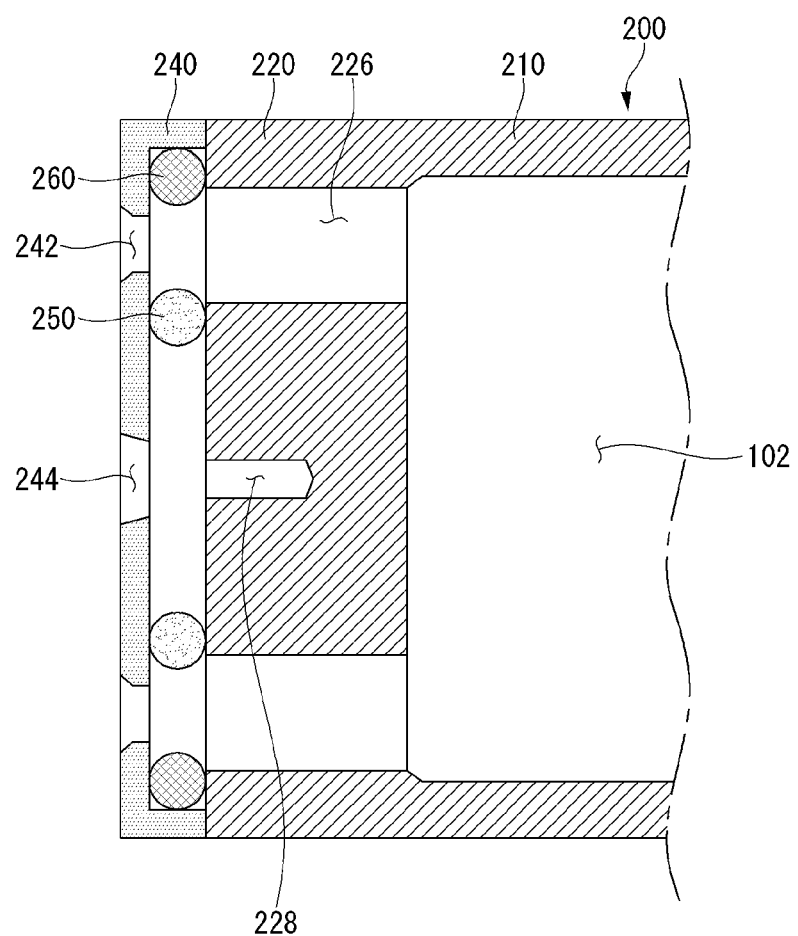
FIGS. 7 and 8 are cross-sectional views of a piston for a compressor according to another embodiment of the disclosure.
Figure 8:
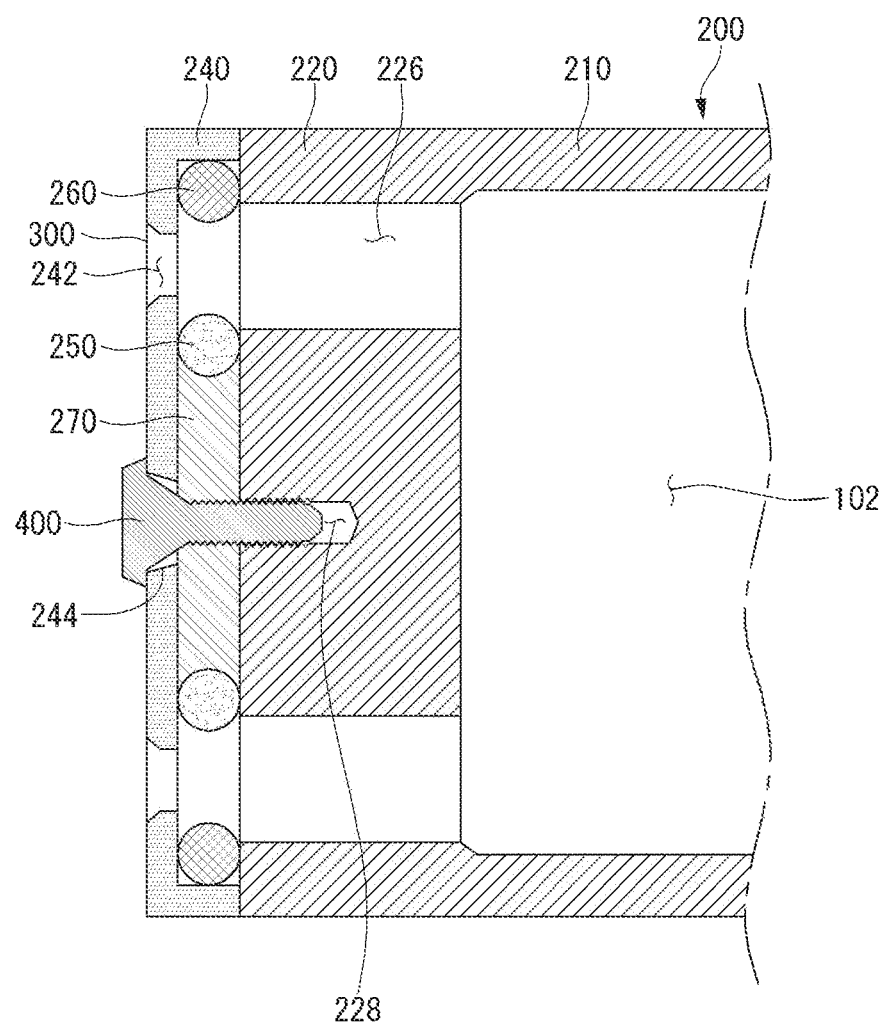

FIGS. 7 and 8 are cross-sectional views of a piston for a compressor according to another embodiment of the disclosure.

Referring to FIGS. 7 and 8, a piston 200 according to another embodiment of the disclosure may include a sliding portion 210, a head portion 220, a press-fit cap 240, a first elastic member 250, a second elastic member 260, a suction valve 300, and a coupling member 400, but can be implemented except some of these components and does not exclude additional components.

Detailed configuration of the piston 200 according to another embodiment of the disclosure which is not described below can be understood to correspond to the detailed configuration of the piston 200 according to an embodiment of the disclosure.

The head portion 220 may include a suction port 226. A cross section of the suction port 226 may have a circular shape. The suction port 226 may pass through the head portion 220 along the axial direction. The suction port 226 may be understood as a hole. The suction port 226 may communicate a compression space 103 with a suction space 102. The suction port 226 may be spaced apart from a coupling groove 228. The suction port 226 may be formed in a region between a central region and an edge region of the head portion 220. The suction port 226 may include a plurality of suction ports. The plurality of suction ports may be spaced apart from each other. The plurality of suction ports may be disposed at positions symmetrical to each other about the coupling groove 228.

The head portion 220 may include the coupling groove 228. The coupling groove 228 may be formed to be recessed rearward from a front surface of the head portion 220. The coupling groove 228 may be formed in a central region of the front surface of the head portion 220. The coupling member 400 may be fastened to the coupling groove 228.

The piston 200 may include the press-fit cap 240. The press-fit cap 240 may be disposed in front of the sliding portion 210. The press-fit cap 240 may be coupled to a front of the head portion 220. The press-fit cap 240 may be formed in a cylindrical shape with an opened rear. The press-fit cap 240 may include an upper plate and a side plate extending from the upper plate. The upper plate of the press-fit cap 240 may be spaced apart from the head portion 220. The first elastic member 250 may be disposed in a separation space between the upper plate of the press-fit cap 240 and the head portion 220. A rear surface of the side plate of the press-fit cap 240 may be disposed on the front surface of the head portion 220.

The press-fit cap 240 may include a suction hole 242. The suction hole 242 may communicate with the suction port 226. A cross section of the suction hole 242 may have a circular shape. The suction hole 242 may be formed on the upper plate of the press-fit cap 240. The suction hole 242 may be formed in a region between a central region and an edge region of the upper plate of the press-fit cap 240. The suction hole 242 may be spaced apart from a coupling hole 244. The suction hole 242 may include a plurality of suction holes. The plurality of suction holes may be disposed at positions symmetrical to each other about the coupling hole 244.

The press-fit cap 240 may include the coupling hole 244. The coupling hole 244 may communicate with the coupling groove 228. A cross section of the coupling hole 244 may have a circular shape. The coupling hole 244 may be formed on the upper plate of the press-fit cap 240. The coupling hole 244 may be formed in the central region of the upper plate of the press-fit cap 240. The coupling hole 244 may be spaced apart from the suction hole 242.

The piston 200 may include the first elastic member 250. The first elastic member 250 may be disposed between the press-fit cap 240 and the head portion 220. The first elastic member 250 may be formed of a material with elasticity. The first elastic member 250 may be formed in a circular band shape. The first elastic member 250 may be referred to as an O-ring. The first elastic member 250 may be formed inside the suction port 226. The first elastic member 250 may be disposed in a separation space between the upper plate of the press-fit cap 240 and the head portion 220. An axial length of the first elastic member 250 may correspond to an axial length of the separation space between the upper plate of the press-fit cap 240 and the head portion 220. The first elastic member 250 may be formed outside the coupling groove 228. The first elastic member 250 may be disposed at a position corresponding to an area between the coupling groove 228 and the suction port 226. The first elastic member 250 allows securing a space in which a gas layer can be formed therein.

The piston 200 may include the second elastic member 260. The second elastic member 260 may be disposed between the press-fit cap 240 and the head portion 220. The second elastic member 260 may be formed of a material with elasticity. The second elastic member 260 may be formed in a circular band shape. The second elastic member 260 may be referred to as an O-ring. The second elastic member 260 may be formed outside the suction port 226. The second elastic member 260 may be formed outside the first elastic member 250. A space between the first elastic member 250 and the second elastic member 260 may communicate with the suction port 226 and the suction hole 242. The second elastic member 260 may contact an inside surface of the upper plate of the press-fit cap 240, an inside surface of the side plate of the press-fit cap 240, and the front surface of the head portion 220. The second elastic member 260 can prevent a gas passing through the suction port 226 and the suction hole 242 from leaking.

The piston 200 may include the coupling member 400. The coupling member 400 may couple the suction valve 300 and the press-fit cap 240 to the front of the head portion 220. The coupling member 400 may pass through the coupling hole 244. The coupling member 400 may be fastened to the coupling groove 228. When the coupling member 400 passes through the coupling hole 244 and is fastened to the coupling groove 228, the coupling member 400 can couple the suction valve 300 and the press-fit cap 240 to the head portion 220, and at the same time can seal between the head portion 220, the press-fit cap 240, and the first elastic member 250 from the outside. Hence, a gas layer 270 can be formed between the head portion 220, the press-fit cap 240, and the first elastic member 250. Further, the gas layer 270 with low thermal conductivity can prevent heat transfer to the cylinder 140, pistons 150 and 200, and sucked refrigerant of a relatively low temperature generated as a high temperature and high pressure gas compressed in the compression space 103 acts as a heat source. The gas layer 270 may be an air layer, but may be filled with other gases with low thermal conductivity.

Figure 9:
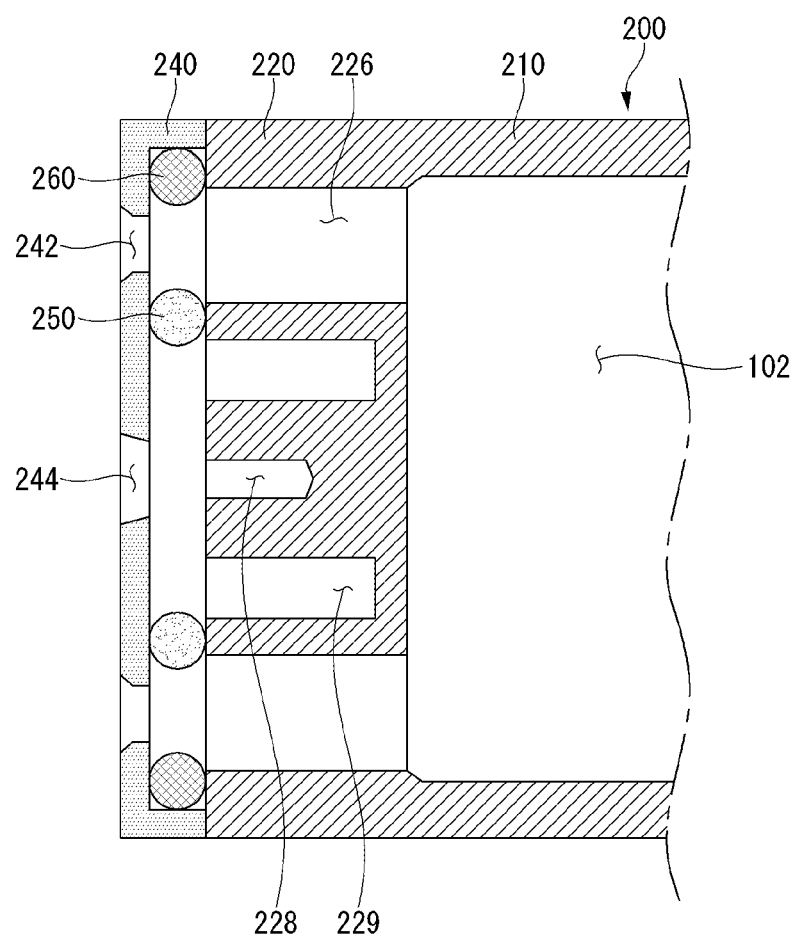
FIGS. 9 and 10 are cross-sectional views of a piston for a compressor according to another embodiment of the disclosure.
Figure 10:
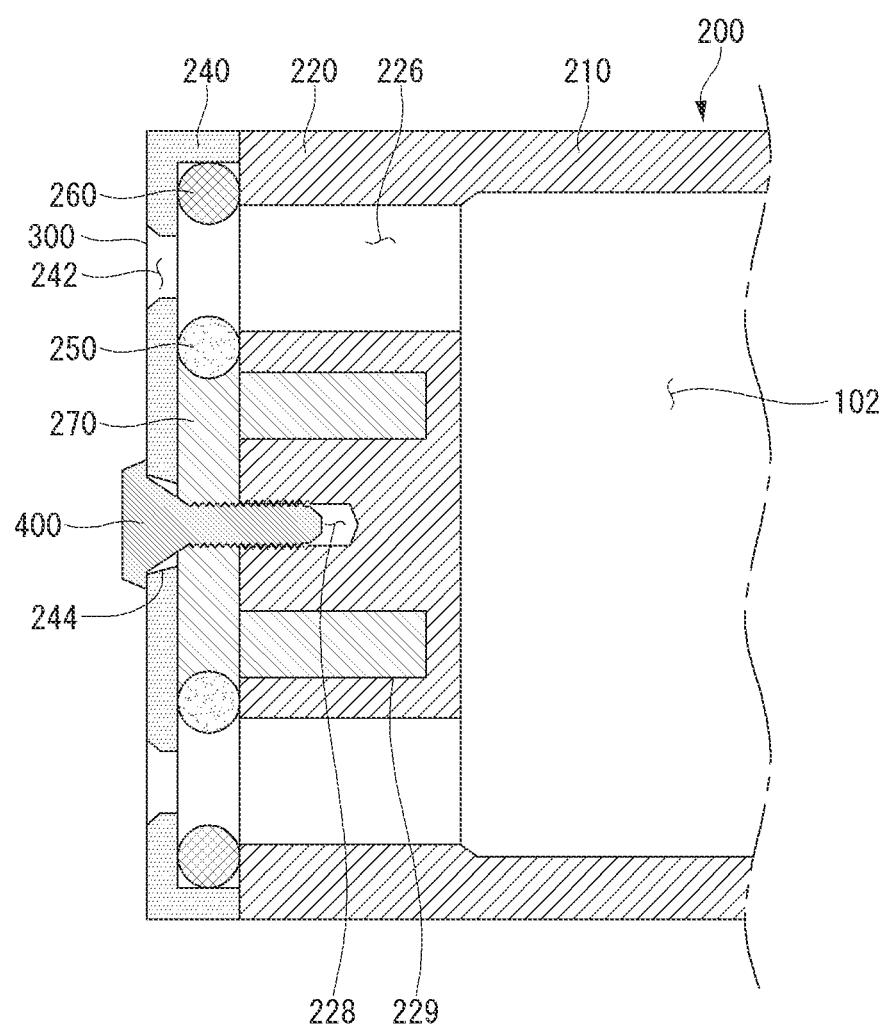

FIGS. 9 and 10 are cross-sectional views of a piston for a compressor according to another embodiment of the disclosure.

Referring to FIGS. 9 and 10, a piston 200 according to another embodiment of the disclosure may include a sliding portion 210, a head portion 220, a press-fit cap 240, a first elastic member 250, a second elastic member 260, a suction valve 300, and a coupling member 400, but can be implemented except some of these components and does not exclude additional components.

Detailed configuration of the piston 200 according to another embodiment of the disclosure which is not described below can be understood to correspond to the detailed configuration of the piston 200 according to an embodiment of the disclosure.

The head portion 220 may include a gas groove 229. The gas groove 229 may be formed to be recessed rearward from a front surface of the head portion 220. The gas groove 229 may be disposed between a suction port 226 and a coupling groove 228. The gas groove 229 may be formed in a circular band shape. Hence, a gas layer 270 can be formed between the head portion 220, the press-fit cap 240, the first elastic member 250, and the gas groove 229. Since the gas layer 270 is formed in a wider area than other embodiments of the present disclosure, this can improve the efficiency of preventing heat transfer to the cylinder 140, pistons 150 and 200, and sucked refrigerant of a relatively low temperature generated as a high temperature and high pressure gas compressed in a compression space 103 acts as a heat source.

Figure 11:
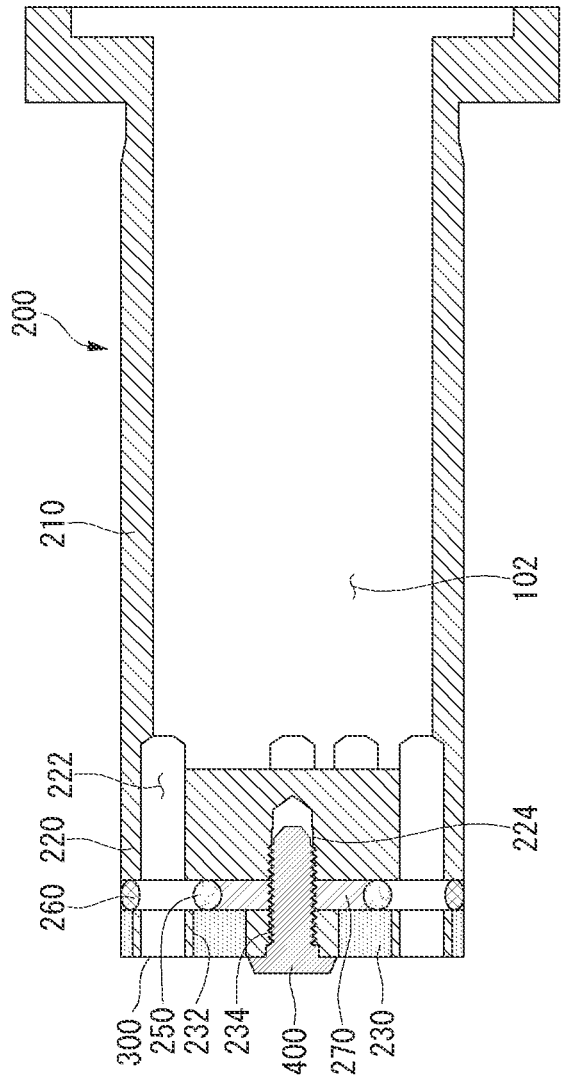
FIG. 11 is a cross-sectional view of a piston for a compressor according to another embodiment of the disclosure.
Figure 12:
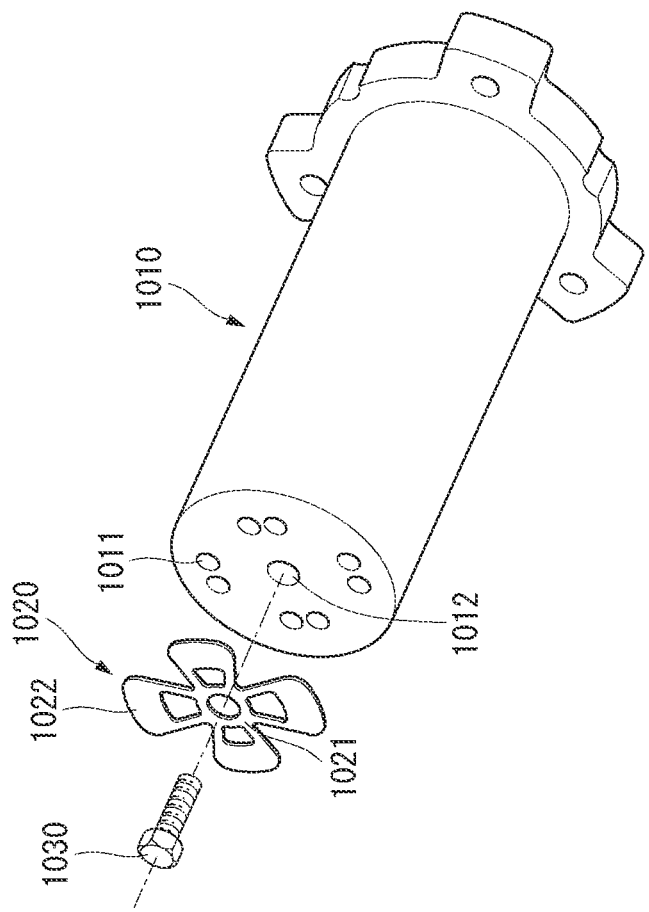
FIG. 12 is a perspective view illustrating a piston for a compressor according to a related art.

FIG. 11 is a cross-sectional view of a piston for a compressor according to another embodiment of the disclosure.

Referring to FIG. 11, a piston 200 according to another embodiment of the disclosure may include a sliding portion 210, a head portion 220, a heat insulating member 230, a first elastic member 250, a second elastic member 260, a suction valve 300, and a coupling member 400, but can be implemented except some of these components and does not exclude additional components.

Detailed configuration of the piston 200 according to another embodiment of the disclosure which is not described below can be understood to be the same as the detailed configuration of the piston 200 according to an embodiment of the disclosure.

The piston 200 may include the first elastic member 250. The first elastic member 250 may be disposed between the heat insulating member 230 and the head portion 220. The first elastic member 250 may be formed of a material with elasticity. The first elastic member 250 may be formed in a circular band shape. The first elastic member 250 may be referred to as an O-ring. The first elastic member 250 may be formed inside a suction port 222. The first elastic member 250 may be disposed outside a coupling port 224. The first elastic member 250 may be disposed inside the second elastic member 260. The first elastic member 250 allows securing a space in which a gas layer can be formed therein.

The piston 200 may include the second elastic member 260. The second elastic member 260 may be disposed between the heat insulating member 230 and the head portion 220. The second elastic member 260 may be formed of a material with elasticity. The second elastic member 260 may be formed in a circular band shape. The second elastic member 260 may be referred to as an O-ring. The second elastic member 260 may be disposed outside the suction port 222. The second elastic member 260 may be disposed outside the first elastic member 250. The suction port 222 may be disposed in a space between the first elastic member 250 and the second elastic member 260. The second elastic member 260 may contact a rear surface of the heat insulating member 230 and a front surface of the head portion 220.

A gas layer 270 can be formed in a space between the head portion 220, the heat insulating member 230 and the first elastic member 250. The gas layer 270 with low thermal conductivity and the heat insulating member 230 can prevent heat transfer to the cylinder 140, pistons 150 and 200, and sucked refrigerant of a relatively low temperature generated as a high temperature and high pressure gas compressed in a compression space 103 acts as a heat source. The gas layer 270 may be an air layer, but may be filled with other gases with low thermal conductivity.

As described herein, the heat transfer in the compressor 100 mainly occurs in the head portion 220 of the pistons 150 and 200. That is, because the heat insulating member 230 and the gas layer 270 according to embodiments of the disclosure are disposed in the head portion 220, the heat insulating member 230 and the gas layer 270 can prevent heat transfer to the cylinder 140, pistons 150 and 200, and sucked refrigerant of a relatively low temperature generated as a high temperature and high pressure gas compressed in the compression space 103 acts as a heat source.

Some embodiments or other embodiments of the disclosure described above are not exclusive or distinct from each other. Some embodiments or other embodiments of the disclosure described above can be used together or combined in configuration or function.

For example, a configuration "A" described in an embodiment and/or the drawings and a configuration "B" described in another embodiment and/or the drawings can be combined with each other. That is, although the combination between the configurations is not directly described, the combination is possible except if it is described that the combination is impossible.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

What is claimed is:

1. A piston for a compressor, wherein the compressor includes a cylinder configured to receive a refrigerant and is configured to compress and discharge the refrigerant in the cylinder, the piston comprising:
    a sliding portion that is disposed in the cylinder and that defines a suction space that receives the refrigerant;
    a head portion connected to the sliding portion and including a suction port that fluidly communicates with a compression space and the suction space, wherein the compression space is defined at a first side of the head portion, and wherein the suction space is defined at a second side of the head portion opposite to the first side of the head portion;
    a cap connected to the first side of the head portion, the cap including a suction hole that fluidly communicates with the suction port of the head portion; and
    a first elastic member disposed between the cap and the head portion,
    wherein the head portion, the cap, and the first elastic member define a gas layer, and wherein the gas layer is sealed by the head portion, the cap, and the first elastic member.

2. The piston for the compressor of claim 1, wherein the first elastic member has a circular band shape.

3. The piston for the compressor of claim 2, wherein the first elastic member is disposed radially closer to an axis of the piston than the suction port of the head portion.

4. The piston for the compressor of claim 2, further comprising a second elastic member disposed between the cap and the head portion around the first elastic member.

5. The piston for the compressor of claim 4, wherein the second elastic member has a circular band shape, and
    wherein the second elastic member is disposed radially farther from an axis of the piston than the suction port of the head portion.

6. The piston for the compressor of claim 4, wherein a space between the first elastic member and the second elastic member fluidly communicates with the suction port and the suction hole.

7. The piston for the compressor of claim 1, wherein the head portion comprises a coupling groove that is defined at the first side of the head portion and spaced apart from the suction port.

8. The piston for the compressor of claim 7, further comprising a coupling member that couples the cap to the first side of the head portion,
    wherein the cap comprises a coupling hole that is aligned with the coupling groove of the head portion, and
    wherein the coupling member extends through the coupling hole and is coupled to the coupling groove.

9. The piston for the compressor of claim 7, wherein the first elastic member is disposed between the coupling groove and the suction port.

10. The piston for the compressor of claim 7, wherein the head portion comprises a gas groove between the coupling groove and the suction port.

11. The piston for the compressor of claim 10, wherein the head portion, the cap, the first elastic member, and the gas groove define the gas layer.

12. The piston for the compressor of claim 10, wherein the gas groove extends axially at the first side of the head portion.

13. The piston for the compressor of claim 12, wherein the gas groove has a circular band shape.

14. A piston for a compressor, wherein the compressor includes a cylinder configured to receive a refrigerant and is configured to compress and discharge the refrigerant in the cylinder, the piston comprising:
    a sliding portion that is disposed in the cylinder and that defines a suction space that receives the refrigerant;
    a head portion connected to the sliding portion and including a suction port that fluidly communicates with a compression space and the suction space, wherein the compression space is defined at a first side of the head portion, and wherein the suction space is defined at a second side of the head portion opposite to the first side of the head portion; and
    a heat insulating member connected to the first side of the head portion, the heat insulating member including a suction port reception hole that at least partially receives the suction port of the head portion.

15. The piston for the compressor of claim 14, wherein the suction port protrudes axially from the first side of the head portion.

16. The piston for the compressor of claim 15, wherein the head portion comprises a coupling port that protrudes axially from the first side of the head portion and is spaced apart from the suction port.

17. The piston for the compressor of claim 16, further comprising a coupling member that couples the heat insulating member to the first side of the head portion,
    wherein the heat insulating member comprises a coupling port reception hole that at least partially receives the coupling port, and
    wherein the coupling member extends through the coupling port reception hole and is coupled to the coupling port.

18. The piston for the compressor of claim 14, further comprising a first elastic member disposed between the heat insulating member and the head portion,
   wherein the head portion, the heat insulating member, and the first elastic member define a gas layer.

19. The piston for the compressor of claim 18, wherein the first elastic member has a circular band shape.

20. The piston for the compressor of claim 18, further comprising a second elastic member disposed between the heat insulating member and the head portion around the first elastic member.

* * * * *